(No Model.)
J. E. GAGE.
SINKER FOR FISH LINES.
No. 399,866. Patented Mar. 19, 1889.
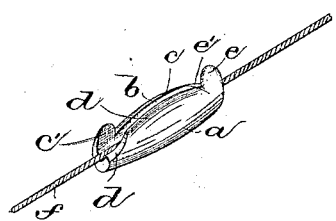
Fig: 1
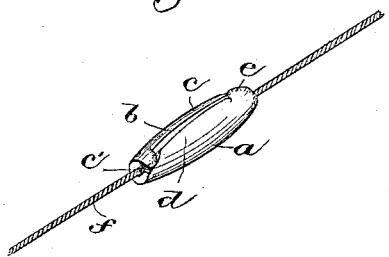
Fig: 2
Witnesses.
Howard F. Eaton.
John F.C. Prentkirk
Inventor:
James E. Gage.
By Crosby & Gregory
attys.

UNITED STATES PATENT OFFICE.

JAMES E. GAGE, OF CONCORD, NEW HAMPSHIRE.

SINKER FOR FISH-LINES.

SPECIFICATION forming part of Letters Patent No. 399,866, dated March 19, 1889.

Application filed September 18, 1888. Serial No. 285,693. (No model.)

*To all whom it may concern:*

Be it known that I, JAMES E. GAGE, of Concord, county of Merrimac, State of New Hampshire, have invented an Improvement in Sinkers for Fish-Lines, of which the following description, in connection with the accompanying drawings, is a specification, like letters on the drawings representing like parts.

This invention has for its object to construct a sinker for fish-lines which may be cheaply made, and readily and firmly applied.

In accordance with this invention a piece of lead or equivalent soft metal is slotted longitudinally to receive the line. One of the side walls of the slot is provided at one end with a small lip, and the corresponding end of the opposing side wall is provided with a small recess to receive the said lip when bent or pressed down firmly over and upon the line contained in the slot. At the opposite end of the sinker a similar lip and recess are provided, the lip preferably being formed upon that wall which at its opposite end has a recess.

Figure 1 shows in perspective a sinker or weight embodying this invention; and Fig. 2, a similar view, the lips being turned down to hold firmly upon the line.

The sinker is made of lead or equivalent soft material, and comprises the body $a$, having a longitudinal slot, $b$, extending from end to end. One of the side walls, as $c$, of the slot has at one end a small lip, $c'$, formed integral with it, and the opposing side wall, $d$, has at its corresponding end a recess, $d'$, which receives the lip $c'$ when turned down, said recess being cut deep enough to allow the lip when turned to bind firmly upon the line $f$. At the opposite end of the sinker a similar lip, as $e$, and recess, as $e'$, are provided, the lip preferably being formed integral with the side wall, $d$, and the recess in the opposing side wall; but they may be reversed, if desired.

By this construction it will be seen that the sinker may be molded cheaply, and may be readily applied by simply turning the lips $c'$ $e$ over and upon the line, binding or holding firmly upon the line without kinking or cutting into the line, thereby avoiding the faults of sinkers heretofore known to me.

I claim—

A sinker or weight consisting of the body $a$, slitted longitudinally from end to end, having lips $c'$ $e$ at the ends thereof, and recesses $d$ $e'$, opposite said lips, respectively adapted to receive the same when turned down upon them, substantially as and for the purpose described.

In testimony whereof I have signed my name to this specification in the presence of two subscribing witnesses.

JAMES E. GAGE.

Witnesses:
ARTHUR C. CHASE,
WM. M. CHASE.